(12) United States Patent
Gensler et al.

(10) Patent No.: US 9,334,894 B2
(45) Date of Patent: May 10, 2016

(54) FASTENING ELEMENT WITH MULTIPLE JOINING DIRECTIONS AND CORRESPONDING FASTENING ARRANGEMENT FOR THE FASTENING OF AN ATTACHMENT PART ON A VEHICLE BODY

(71) Applicant: Audi AG, Ingolstadt (DE)

(72) Inventors: Marco Gensler, München (DE); Stefan Wölkl, Manching (DE); Mark Nessel, Kösching (DE)

(73) Assignee: AUDI AG, Ingolstadt (DE)

( * ) Notice: Subject to any disclaimer, the term of this patent is extended or adjusted under 35 U.S.C. 154(b) by 309 days.

(21) Appl. No.: 14/012,419

(22) Filed: Aug. 28, 2013

(65) Prior Publication Data

US 2014/0064880 A1  Mar. 6, 2014

(30) Foreign Application Priority Data

Aug. 29, 2012  (DE) .......................... 10 2012 017 088

(51) Int. Cl.
| | | |
|---|---|---|
| *E01B 9/12* | (2006.01) | |
| *F16B 37/00* | (2006.01) | |
| *F16B 21/07* | (2006.01) | |
| *F16B 37/08* | (2006.01) | |

(52) U.S. Cl.
CPC ............... *F16B 37/00* (2013.01); *F16B 21/073* (2013.01); *F16B 37/0842* (2013.01); *F16B 37/0878* (2013.01)

(58) Field of Classification Search
CPC .... F16B 21/073; F16B 37/00; F16B 37/0842; F16B 37/0878; E01B 9/12

USPC ................................. 411/511, 522, 523, 527
See application file for complete search history.

(56) References Cited

U.S. PATENT DOCUMENTS

| | | | | |
|---|---|---|---|---|
| 2,364,880 | A | | 12/1944 | Tinnerman |
| 4,550,891 | A | * | 11/1985 | Schaty .................. F16B 21/071 174/166 R |
| 5,460,342 | A | * | 10/1995 | Dore .................... B60R 16/0215 248/68.1 |
| 6,070,836 | A | * | 6/2000 | Battie ...................... F16L 3/223 248/68.1 |
| 6,382,343 | B1 | * | 5/2002 | Engler .................. B62D 5/062 180/417 |

(Continued)

FOREIGN PATENT DOCUMENTS

| | | |
|---|---|---|
| CN | 201636185 U | 11/2010 |
| CN | 102472306 A | 5/2012 |

(Continued)

OTHER PUBLICATIONS

Chinese Search Report issued in counterpart Chinese Patent Application No. 2013103821829 on May 4, 2015.

(Continued)

*Primary Examiner* — Roberta Delisle
(74) *Attorney, Agent, or Firm* — Henry M. Feiereisen LLC

(57) ABSTRACT

A fastening element for fastening an attachment on a vehicle body includes a basic body having a recess and multiple spring tongues arranged in the recess, wherein the multiple spring tongues are constructed for holding the fastening element on a fastening bolt arranged on the vehicle body and received in the recess, wherein the recess has two opening regions enabling connection of the fastening element with the fastening bolt in at least two joining directions.

9 Claims, 2 Drawing Sheets

(56) References Cited

U.S. PATENT DOCUMENTS

| | | | | |
|---|---|---|---|---|
| 6,708,931 | B2* | 3/2004 | Miura | F16B 37/00 248/635 |
| 6,901,638 | B2* | 6/2005 | Itou | E05B 9/084 24/459 |
| 7,008,160 | B2* | 3/2006 | Kanie | F16B 37/0842 411/433 |
| 7,533,852 | B2* | 5/2009 | Stigler | F16L 3/223 24/555 |
| 7,651,057 | B2* | 1/2010 | Sedivy | F16B 37/0842 248/68.1 |
| 7,946,781 | B2* | 5/2011 | Mudel | F16B 41/002 403/12 |
| 2005/0260895 | A1* | 11/2005 | Aoshima | F16B 5/0685 439/752 |
| 2009/0028668 | A1* | 1/2009 | Luk | F16B 37/0857 411/511 |
| 2010/0232905 | A1 | 9/2010 | Kempf et al. | |

FOREIGN PATENT DOCUMENTS

| | | |
|---|---|---|
| DE | 3416677 | 11/1985 |
| DE | 19607000 | 8/1997 |
| DE | 10053599 | 5/2002 |
| DE | 102004017449 | 10/2005 |
| DE | 102009012783 | 9/2010 |
| DE | 10 2010 004686 A1 | 7/2011 |
| EP | 0661464 | 5/1995 |
| EP | 2 233 755 A2 | 9/2010 |
| FR | 2 474 134 A1 | 7/1981 |

OTHER PUBLICATIONS

English translation of Chinese Search Report issued in counterpart Chinese Patent Application No. 2013103821829 on May 4, 2015.

* cited by examiner

FASTENING ELEMENT WITH MULTIPLE JOINING DIRECTIONS AND CORRESPONDING FASTENING ARRANGEMENT FOR THE FASTENING OF AN ATTACHMENT PART ON A VEHICLE BODY

CROSS-REFERENCES TO RELATED APPLICATIONS

This application claims the priority of German Patent Application, Serial No. 10 2012 017 088.2, filed Aug. 29, 2012 pursuant to 35 U.S.C. 119(a)-(d), the content of which is incorporated herein by reference in its entirety as if fully set forth herein.

BACKGROUND OF THE INVENTION

The invention relates to a fastening element or a fastening means for fastening an attachment part on a vehicle body.

SUMMARY OF THE INVENTION

According to one aspect of the present invention, a fastening element for fastening an attachment part on a vehicle body, wherein the fastening element includes a basic body having a recess and multiple spring tongues arranged in the recess, wherein the multiple spring tongues are constructed for holding the fastening element on a fastening bolt arranged on the vehicle body and received in the recess, and wherein the recess has at least two opening regions enabling connection of the fastening element with the fastening bolt in at least two joining directions.

According to another aspect of the present invention, a fastening arrangement, includes a fastening element including a basic body having a recess and multiple spring tongues arranged in the recess; and a fastening bolt receivable in the recess of the fastening element, wherein the multiple spring tongues are constructed for holding the fastening element on the fastening bolt, and wherein the recess has two opening regions enabling connection of the fastening element with the fastening bolt in at least two joining directions The fastening arrangement thus includes a fastening element according to the invention and a fastening bolt on which the fastening element according to the invention is or can be fastened or with which the fastening element according to the invention is or can be connected in a force fitting and/or form fitting manner.

For the fastening, the fastening element according to the invention is mechanically connected, in particular by pushing on or seating on, with the fastening bolt arranged on the vehicle body, and holds onto or can hold onto this fastening bolt with the multiple spring tongues, however with at least one spring tongue.

The basic body or corpus of the fastening element according to the invention thus has a recess or a receiving region for receiving a fastening bolt situated on the vehicle body, which recess or receiving region has at least two opening regions. This means in particular that the recess is open toward two body sides or in at least two spatial directions. The different opening regions of the recess can transition into each other and form a common opening region. For example, it can be provided that the recess for receiving the fastening bolt which is situated on the vehicle body has a common opening region which extends over two adjacent side surfaces or bordering outer regions of the basic body so that the recess is open towards at least two body sides or in two spatial directions, as described before.

The different opening regions allow fastening or connecting of the fastening element according to the invention on or with the fastening bolt situated on the vehicle body in multiple translational movement directions or joining directions. Advantageously, this results in multiple degrees of freedom when joining the fastening element according to the invention with a fastening bolt situated on the vehicle body and during mounting of an attachment part. The separation direction for releasing the fastening element according to the invention from the fastening bolt can deviate from the joining direction during fastening or connecting. Advantageously, multiple degrees of freedom are also available during releasing or disassembly.

According to another advantageous feature of the invention, the basic body of the fastening element according to the invention is configured essentially closed, except for the opening regions of the recess, which ensures a high dimensional stability and rigidity of the mechanical connection brought about by the fastening bolt. In particular, the basic body has a closed sheath wall except for the opening regions of the recess. With regard to the joining direction, the basic body can for example have a lower opening region and a lateral opening region, which preferably transition into each other and can form a common opening region. Preferably, the spring tongues protrude out of the recess at a lateral opening region of the recess, which facilitates connecting the fastening element according to the invention (with a fastening bolt) in a lateral joining direction.

A fastening bolt has an axial extent. An example for a fastening bolt is a stud, which is configured with a bolt head, with circumferential grooves or a threading, in particular a coarse threading. Preferably, the fastening bolt is a welding stud, which is immovably fastened on the vehicle body and in particular protrudes perpendicularly from the fastening plane. The fastening bolt can be directly fastened to a component that belongs to the vehicle bodyshell or indirectly via an attachment part on the vehicle body. The invention can however also be implemented in that the fastening element according to the invention is immovably fastened on the vehicle body and can receive a corresponding fastening bolt which for example is arranged directly on the attachment part to be mounted, for fastening or mounting an attachment part.

The attachment part to be mounted is in particular an inner trim part or other component that is to be fastened in the interior of the vehicle. An attachment part is or can be fastened on the vehicle body with multiple fastening elements or fastening arrangements according to the invention.

According to another advantageous feature of the invention, the structurally predetermined possible joining directions of the fastening element according to the invention can be perpendicular to each other. A first joining direction can form example correspond to the axial direction of the fastening bolt (axial joining direction). A second joining direction (lateral joining direction) can for example correspond to a direction, which is perpendicular to the axial of the fastening bolt direction (normal to the longitudinal axis of the fastening bolt). The recess in the basic body of the fastening element according to the invention and its opening regions are configured correspondingly.

According to another advantageous feature of the invention, the spring tongues can be arranged in the recess of the fastening element according to the invention so as to be pairwise opposed to each other and rest with their confronting free front tongue ends form fittingly against the fastening bolt and are thus able to hold or fix the fastening element on the fastening bolt. At least one spring tongue pair is provided. Preferably, multiple spring tongue pairs can be arranged in the recess. In particular, between two and four spring tongue pairs can be provided. Further preferably, the spring tongues of a spring tongue pair are arranged so as to be slightly offset relative to each other in axial direction (of the fastening bolt or the recess).

At least one opening region of the recess in the basic body and in particular a front or lateral opening border can be configured with an outer slant and/or rounding. Such a slant and/or rounding can function as lead-in chamfer and prevent seizing when connecting the fastening element according to the invention with the fastening bolt.

As already explained, the recess in the basic body can have a lateral opening region, wherein the basic body is preferably stabilized in the section of this lateral opening region by a ribbing formed on the basic body. In particular, this ribbing is situated outside on the basic body and includes for example two single ribs, which stabilize the axial longitudinal edges of the lateral opening region and thereby ensure an enduring connection between the fastening element according to the invention and a fastening bolt by supporting the spring tongues in the lateral opening region.

According to another advantageous feature of the invention, the basic body can be configured with an essentially uniform wall thickness. It is also preferable that the spring tongues are configured with an essentially uniform or constant thickness. In particular the wall thickness of the basic body, at least on average, corresponds to about twice the thickness of the spring tongues.

According to another advantageous feature of the invention, the spring tongues can be hingedly connected on one side on the basic body and otherwise be configured free standing. For example, the spring tongues can be configured essentially rectangular, in which case they are then hingedly connected on an inner side of the recess with a longitudinal outer edge so that the remaining outer edges (i.e., front free tongue ends and the lateral edges) are exposed.

According to another advantageous feature of the invention the spring tongues can be configured slanted. This means in particular that the front free tongue ends point away from a bottom opening region of the recess.

According to another advantageous feature of the invention, the fastening element according to the invention can be formed one-piece from a plastic material. In particular it is a one-piece plastic injection molded part

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
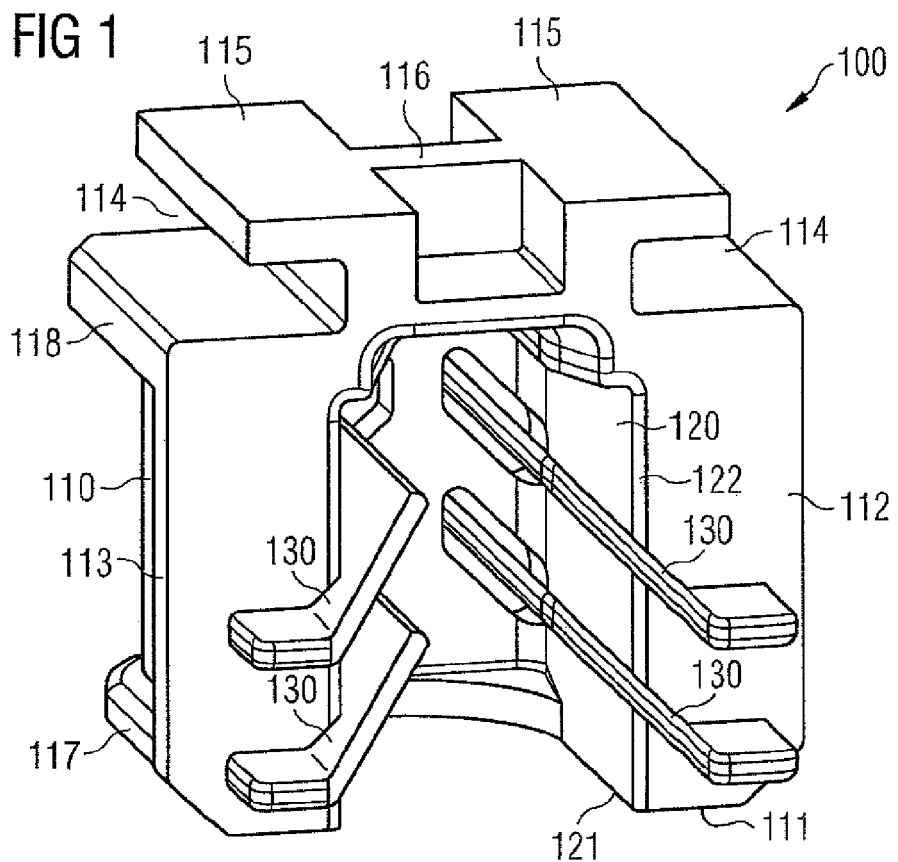
FIG. 1 shows a fastening element according to the invention in a perspective front view.

Throughout all the Figures, same or corresponding elements may generally be indicated by same reference numerals. These depicted embodiments are to be understood as illustrative of the invention and not as limiting in any way. The references to direction and location used in the following relate merely to the representations shown in the Figures and can deviate from the actual mounting situations. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a fastening element according to the invention overall designated with 100. The fastening element 100 has an approximately rectangular shaped basic body or corpus 110, in which a central recess 120 is formed. The recess 120 has a lower opening border 121 and a front or lateral opening border 122. The lower opening border 121 surrounds a lower opening region on the bottom side 111 of the basic body 110. The front opening border 122 surrounds a front or lateral opening region on the front side 112 of the basic body 110. The two opening regions transition into each other. The front opening border 122 is formed with a slant or a rounding.

Within the recess 120 overall four pair-wise opposed spring tongues or latching tongues or flaps 130 are arranged. The spring tongues 130 are slanted or tilted so that the front free tongue ends point way from the lower opening border 121 or from the lower opening region. Preferably, the opposing spring tongues 130 are arranged slightly offset to each other in axial direction (cf. FIG. 3). The spring tongues 130 protrude in lateral direction over the front side 112 of the basic body 110 and thus protrude over the front opening border 122 out of the recess 120. For supporting the spring tongues 130 and for improving the dimensional stability of the basic body 110 an outer ribbing 113 is provided on the basic body 110 on both sides of the front opening border 122. 117 and 118 designate stiffening ribbings, which circumferentially surround the basic body 110 on three sides in the lower region and the upper region. The set back wall region between the stiffening ribs 117 and 118 can serve as grasping region when handling the fastening element 100.

At its topside, which is opposite the bottom side 111, the basic body 110 is formed with a double groove 114 for the form fitting connection of a trim panel to be fastened. The double groove 114 also enables limited tolerance compensation. The gripping arms 115, which form the double groove 114, are supported against each other by (at least) one transverse rib 116.

The fastening element 100 is formed one-piece from a plastic material. Preferably, it is a plastic injection molded part. The basic body 110 has an essentially uniform wall thickness, which can approximately correspond to twice the thickness of the spring tongues 130.

Figure 2:
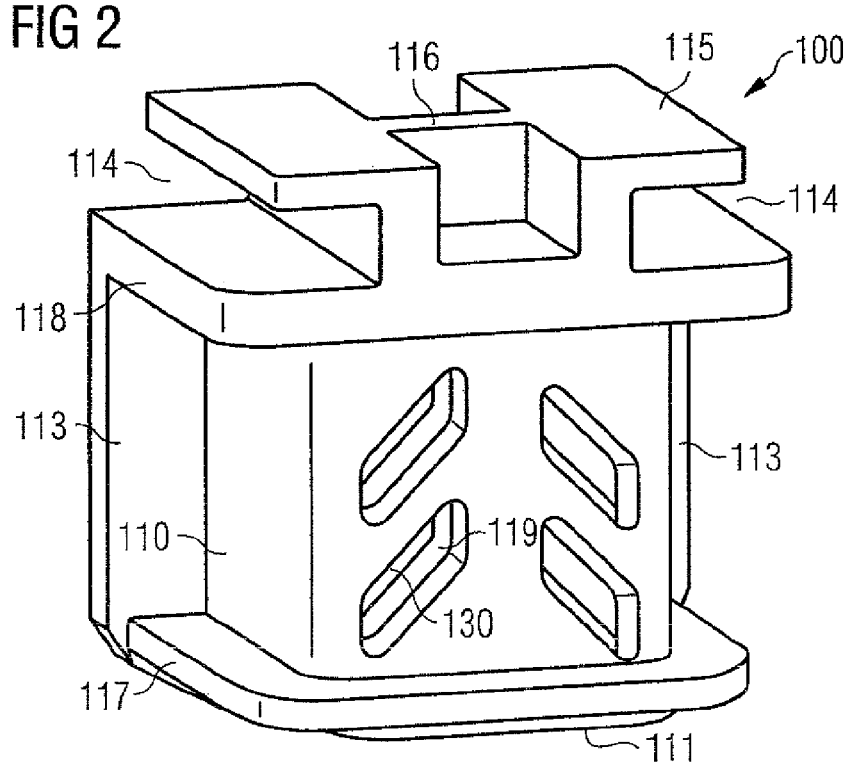
FIG. 2 shows the fastening element of FIG. 1 in a perspective rear view.

FIG. 2 shows the fastening element 100 from the rear. 119 designates openings in the rear wall of the fastening element 100 which rear wall is opposite to the front side 112. Tool mandrels can traverse the openings 119 during manufacturing of the fastening element 100 in an injection molding tool to prevent a connection of the spring tongues 130 with the back wall. Thus, the fastening element 100 can be manufactured cost effectively in a conventionally constructed injection molding tool (without slider technology) with circumferentially free standing spring tongues 130. The offset arrangement in axial direction of the openings 119 corresponds to the axial offset of an opposing spring tongue pair, as explained above.

Figure 3:
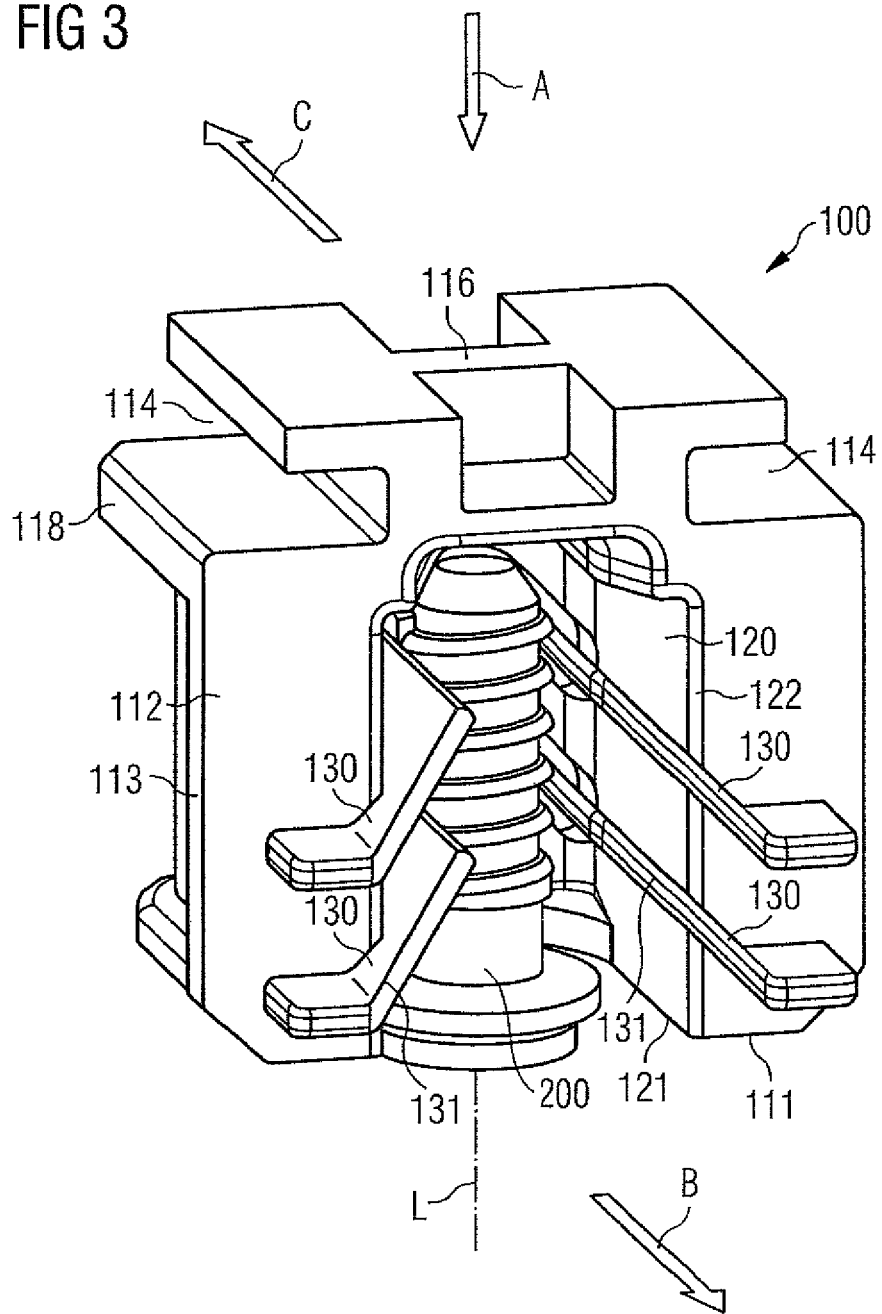
FIG. 3 shows the fastening element of FIG. 1 fastened on a fastening bolt in a perspective front view.

FIG. 3 shows the fastening element 100, which is fastened on a fastening bolt 200 situated on a vehicle body. The fastening bolt 200 is for example a so called coarse threaded bolt. The fastening element 100 overlaps the coarse threaded bolt 200 with its recess 120, wherein the spring tongues 130 rest force and/or form fittingly against the coarse threaded bolt 200 with their front free tongue ends 130 which serve as latching edges, and in this way establish a permanent connection or fastening of the fastening element 100 with the or on the fastening bolt 200. As a result of the slant of the spring tongues 130, a high connection strength between the fastening element 100 and the fastening bolt 200 is achieved in particular in axial direction L of the coarse fastening bolt 200.

In order to fasten the fastening element 100 on the fastening bolt 200 or with the fastening bolt 200, the recess 120 in the fastening element 100 has to be aligned or brought into engagement with the fastening bolt 200. This bringing-into-engagement can occur in different joining directions as explained in the following. The bringing-into-engagement can occur manually or machine based.

A first fastening or connection option provides to position the fastening element 100 with its lower opening border on the bottom side 111 above the coarse threaded bolt 200 and then cause the engagement shown in FIG. 3 by axial movement (along the longitudinal axis L) of the fastening element 100 in the direction toward the coarse threaded bolt 200. The axial joining direction or mounting direction in this fastening option is illustrated with the arrow A. The fastening element 100 is quasi pushed onto the coarse threaded bolt 200 from above and pushed tight, wherein the spring tongues 130 are elastically deformed and then rest against the coarse threaded bolt 200 as explained above. The latching engagement of the front free tongue ends of the spring tongues 130 on the fastening bolt 200 results in a sensitive and/or acoustically perceivable feedback, thereby indicating a correctly established connection. The fastening element 100 is therefore also suited in particular for a concealed fastening or mounting.

In a second fastening option, the fastening element 100 is positioned with its lateral opening region on the front side 112 laterally adjacent the coarse threaded bolt 200 and is then laterally moved in the direction toward the coarse threaded bolt 200 (perpendicular to the axial direction) to achieve the engagement shown in FIG. 3. The lateral joining direction or mounting direction in this fastening option is illustrated with the arrow B. The fastening element 100 is in a manner of speaking aligned and then pushed onto the coarse threaded bolt 200. In order to prevent seizing when laterally pushing the fastening element 100 onto the coarse threaded bolt 200, the spring tongues protrude over the front side 112 and can thus be elastically deflected. Further, the lateral edges 131 of the spring tongues 130 can be configured rounded (as shown in FIG. 3 for the spring tongues 130 shown on the right side).

A further fastening option results from a combination of the two joining directions A and B, wherein the fastening element 100 is quasi obliquely pushed onto or attached to the coarse threaded 200 bolt from above and pushed tight.

For damage-free release of the fastening element 100, it can by slid off or pulled off in lateral direction from the fastening bolt 200, wherein a holding force resulting form the spring tongues 130 has to be overcome. As the case may be, the engagement of the spring tongues 130 can be released or loosened with a tool through the openings 119 in the back wall. The release direction, which is opposite to the joining direction B, is indicated with the arrow C.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A fastening element for fastening an attachment part on a vehicle body said fastening element comprising a basic body having a recess and multiple spring tongues arranged in the recess, said multiple spring tongues being constructed for holding the fastening element on a fastening bolt arranged on the vehicle body and received in the recess, wherein the recess has at least two opening regions enabling connection of the fastening element with the fastening bolt in at least two joining directions, wherein the multiple spring tongues are arranged in the recess so as to pair-wise oppose each other and to rest form fittingly and/or force fittingly against the fastening bolt and thereby holding the fastening element on the fastening bolt.

2. The fastening element of claim 1, wherein the at least two joining directions are essentially perpendicular to each other.

3. The fastening element of claim 1, wherein at least one of the opening regions of the recess is configured with an outer slant or rounding.

4. The fastening element of claim 1, wherein the recess has a lateral opening region which is stabilized by a ribbing formed on the basic body.

5. The fastening element of claim 1, wherein a wall thickness of the basic body corresponds approximately to twice a thickness of the spring tongues.

6. The fastening element of claim 1, wherein the spring tongues are hingedly connected to the basic body on one side and are otherwise configured free standing.

7. The fastening element of claim 1, wherein the spring tongues are configured slanted.

8. The fastening element of claim 1, wherein the fastening element is configured one-piece from a plastic material.

9. A fastening arrangement, comprising:
 a fastening element comprising a basic body having a recess and multiple spring tongues arranged in the recess; and
 a fastening bolt receivable in the recess of the fastening element, said multiple spring tongues being constructed for holding the fastening element on the fastening bolt, said recess having two opening regions enabling connection of the fastening element with the fastening bolt in at least two joining directions, wherein the multiple spring tongues are arranged in the recess so as to pair-wise oppose each other and to rest form fittingly and/or force fittingly against the fastening bolt and thereby holding the fastening element on the fastening bolt.

* * * * *